G. T. MARSHALL.
Salt Trough for Stock.

No. 83,780.                              Patented Nov. 3, 1868.

Witnesses
Theo. Tusche
J. A. Fraser

Inventor
G. T. Marshall
per Munn
Attys

GEORGE T. MARSHALL, OF UNADILLA, MICHIGAN.

*Letters Patent No. 83,780, dated November 3, 1868.*

IMPROVEMENT IN SALTING-TROUGH FOR STOCK.

The Schedule referred to in these Letters Patent and making part of the same.

*To all whom it may concern:*

Be it known that I, GEORGE T. MARSHALL, of Unadilla, in the county of Livingston, and State of Michigan, have invented a new and improved Salting-Trough for Stock; and I do hereby declare that the following is a full, clear, and exact description thereof, which will enable others skilled in the art to make and use the same, reference being had to the accompanying drawings, forming part of this specification.

Similar letters of reference indicate corresponding parts.

This invention relates to an improved trough for salting stock, and consists of an ordinary trough furnished with a lid, which, being connected with a foot-board, is made to rise and uncover the trough when the animal steps upon the foot-board.

A is a trough, resting on cross-pieces $r$, which latter are supported by posts D arising from the bottom frame E of the machine.

The trough has a lid, B, which is lifted by means of a vertical rod, $m$, pivoted in a slot at $m'$ in the lever $h$. This rod passes upward through the hollow block $k$, inside of the trough, and its point encounters the triangular block $n$ which is attached to the lid B.

Figure 1:
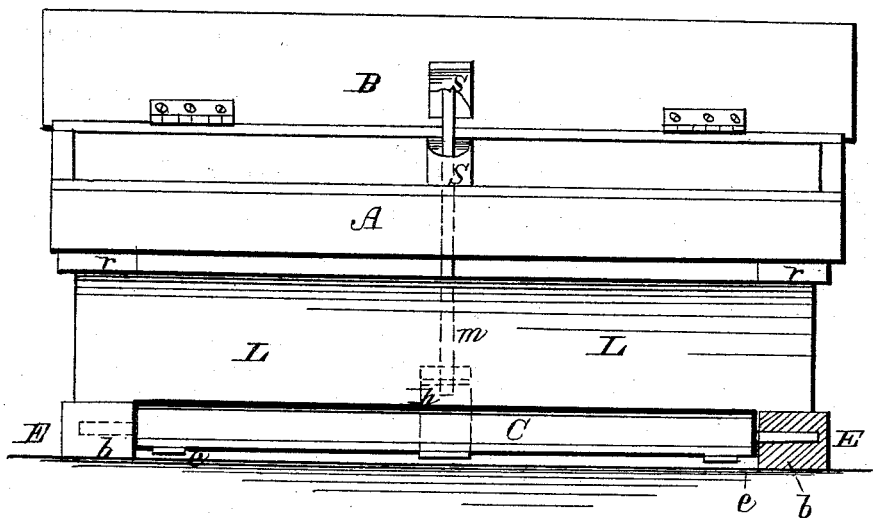
Figure 1 is a front elevation of my improved trough.
Figure 2:
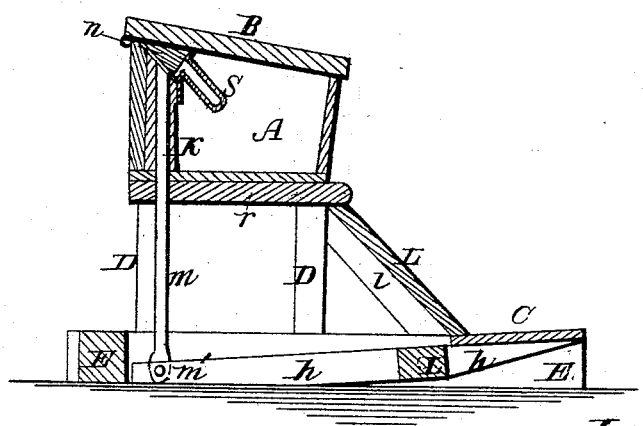
Figure 2 is a cross-section of the same through the line $x-x'$, fig. 1.

The lever $h$ is halved into a cross-beam, I, the ends of which have bearings $b$ in the bottom frames E, as shown at fig. 1. A foot-board, C, rests on the projecting end of the lever $h$ and arms $e$, projecting outward from the beam I, and thus forms a platform or step which cattle will be compelled to step on when within a certain distance from the front of the trough.

The foot-board, beam, and lever, thus rigidly attached to each other, have a partial rotation on the bearings $b$, before shown, whereby, when the foot-board C' is pressed downward, the rod $m$ is thrust upward against the block $n$, and thus raises the lid of the trough.

A strap, $s$, (shown broken away in fig. 1 to expose the rod $m$,) prevents the lid from being thrown over backward by the wind, or from either cause. This strap also keeps the lid inclined so that it will fall.

A sloping board, L, secured to the braces, prevents the cattle from stepping beyond the foot-board, thus causing the lid to fall by the removal of their weight from the said board, while they are at the trough, with their heads within it.

This trough is to be furnished with a quantity of salt, and left in the field or elsewhere, that the cattle can have access to it. They will soon learn to step on and open it.

By this invention a quantity of salt can be left in the trough, closed securely from inclement weather, and readily accessible by the stock, thus obviating the necessity of salting them, at stated periods, by the farm-servants or others.

The tubular block $k$ is designed more especially to keep the salt contained in the trough from contact with the rod $m$, and prevent it from being wasted by falling through the bottom of the trough as the rod is operated.

I claim as new, and desire to secure by Letters Patent—

The inclined board L, in combination with the trough A and foot-board C, upon the lever $h$, whereby the cattle are prevented from stepping beyond the foot-board, inside the fulcrum of the lever $h$, as herein described, for the purpose specified.

GEORGE T. MARSHALL.

Witnesses:
W. D. HARTSUFF,
JAMES CRAIG.